(12) United States Patent
Einwang et al.

(10) Patent No.: US 12,291,268 B2
(45) Date of Patent: May 6, 2025

(54) BODY FOR A PASSENGER CAR AND PASSENGER CAR

(71) Applicant: Bayerische Motoren Werke Aktiengesellschaft, Munich (DE)

(72) Inventors: Martin Einwang, Freising (DE); Andre Koch, Hoehenkirchen-Siegertsbrunn (DE); Lorenz Kriegler, Rottenegg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 298 days.

(21) Appl. No.: 17/925,350

(22) PCT Filed: Apr. 20, 2021

(86) PCT No.: PCT/EP2021/060150
§ 371 (c)(1),
(2) Date: Nov. 15, 2022

(87) PCT Pub. No.: WO2021/233618
PCT Pub. Date: Nov. 25, 2021

(65) Prior Publication Data
US 2023/0234643 A1    Jul. 27, 2023

(30) Foreign Application Priority Data
May 20, 2020   (DE) .................... 10 2020 113 690.0

(51) Int. Cl.
*B62D 21/15*    (2006.01)
*B62D 25/02*    (2006.01)
(Continued)

(52) U.S. Cl.
CPC ......... *B62D 21/152* (2013.01); *B62D 25/025* (2013.01); *B62D 25/04* (2013.01); *B62D 25/08* (2013.01); *B62D 27/023* (2013.01)

(58) Field of Classification Search
CPC ...... B62D 21/15; B62D 21/153; B62D 25/04; B62D 25/025; B62D 25/08; B62D 27/023
(Continued)

(56) References Cited

U.S. PATENT DOCUMENTS 6,286,867 B1 * 9/2001 Braemig ................ B62D 21/15
296/187.03
8,469,442 B1 * 6/2013 Pencak ................ B62D 25/16
296/198
(Continued)

FOREIGN PATENT DOCUMENTS

DE    10 2010 051 271 A1    5/2012
DE    10 2011 089 153 A1    6/2013
(Continued)

OTHER PUBLICATIONS

International Search Report (PCT/ISA/210) issued in PCT Application No. PCT/EP2021/060150 dated Jul. 5, 2021 with English translation (five (5) pages).

Primary Examiner — Dennis H Pedder
(74) Attorney, Agent, or Firm — Crowell & Moring LLP

(57) ABSTRACT

A body for a passenger car has a body-in-white structure which is located behind a wheel well for a front wheel of the passenger car and which has a transverse member that extends on the outside of a longitudinal beam of the body-in-white structure in front of a front end wall of the body-in-white structure in the vehicle transverse direction. The transverse member has a catch element which is designed to catch a rim of the front wheel that has moved backwards in the vehicle longitudinal direction in the event of an accident and is turning in rearward towards the vehicle center. The body-in-white structure has an A-pillar located behind the catch element, a lateral sill located behind the catch element, and a support element which is located in the A-pillar and via which the catch element that has moved backwards in the
(Continued)

event of an accident and, via the catch element, the rim that has moved backwards in the event of an accident, can be supported towards the rear on the lateral sill.

11 Claims, 4 Drawing Sheets

(51) Int. Cl.
  *B62D 25/04* (2006.01)
  *B62D 25/08* (2006.01)
  *B62D 27/02* (2006.01)

(58) Field of Classification Search
  USPC ...... 296/187.09, 1, 29, 193.06, 9, 203.01–3, 296/30
  See application file for complete search history.

(56) References Cited

U.S. PATENT DOCUMENTS

| | | |
|---|---|---|
| 9,132,861 B2 | 9/2015 | Chung |
| 9,643,654 B2 | 5/2017 | Furuaski et al. |
| 9,821,853 B2 * | 11/2017 | Torikawa .............. B62D 25/025 |
| 10,160,496 B2 * | 12/2018 | Kim ..................... B62D 25/025 |
| 2006/0273627 A1 | 12/2006 | Park et al. |
| 2012/0119542 A1 | 5/2012 | Mildner et al. |
| 2013/0161981 A1 | 6/2013 | Mildner |
| 2014/0292031 A1 * | 10/2014 | Nydam .................. B62D 21/15 296/187.12 |
| 2014/0300135 A1 | 10/2014 | Roehrl et al. |
| 2015/0166112 A1 | 6/2015 | Chung |
| 2015/0246692 A1 * | 9/2015 | Rangaswamaiah .... B62D 21/15 296/193.06 |
| 2016/0107699 A1 | 4/2016 | Panganiban et al. |
| 2018/0265133 A1 | 9/2018 | Chiang et al. |
| 2019/0256147 A1 * | 8/2019 | Saje ..................... B62D 25/082 |

FOREIGN PATENT DOCUMENTS

| | | |
|---|---|---|
| DE | 10 2011 121 908 A1 | 6/2013 |
| DE | 10 2014 013 034 A1 | 4/2015 |
| DE | 10 2018 105 803 A1 | 9/2018 |
| WO | WO 94/06669 A1 | 3/1994 |

* cited by examiner

BODY FOR A PASSENGER CAR AND PASSENGER CAR

BACKGROUND AND SUMMARY

The invention relates to a body for a passenger motor vehicle. The invention further relates to a passenger motor vehicle.

Such shell structures are already known from the automotive construction of passenger motor cars. Generally, a self-supporting body which is also referred to as a motor vehicle body or shell (body-in-white) for a passenger motor vehicle in the regions of the wheel housings at both sides has a respective shell structure having an associated transverse member which extends from a laterally associated longitudinal member of a main longitudinal member plane, wherein the longitudinal member is also occasionally referred to as an engine carrier, outwardly in the transverse vehicle direction. Usually, the transverse member is fixed or supported at the vehicle outer side at the front of a laterally assigned lateral sill. Furthermore, the transverse member generally extends in front of a front end wall of the shell which is also referred to as a motor vehicle shell, wherein the passenger compartment, which is also referred to as the interior, of the front car section is delimited by the end wall.

Particularly in front-end collisions with small width overlap of such a passenger motor vehicle with an obstacle or another vehicle, such shell structures are acted on very considerably with forces behind the wheel housing of the front wheel, at the side of which the collision with the obstacle occurs, and must accordingly be configured in order, for example, to allow a favorable discharge of the accident energy or to prevent excessive intrusions into the front end wall of the passenger compartment.

In this instance, a problem is that the front wheel which is displaced backward as a result of a front-end collision with small width overlap of the passenger motor vehicle with an obstacle or another vehicle, and after destruction of the tire thereof, in particular the backwardly displaced rim which is often not displaced linearly backward in the longitudinal vehicle direction as a result of the connection thereof by respective chassis members (links), but instead turns inward in the rear region toward the vehicle center. In this case, the chassis members or links act as corresponding levers about a notional axis about which the front wheel or in particular the rim with the rear region thereof turns inwardly toward the vehicle center.

However, it is the case, as a result of the structure, that the shell structure or the end wall thereof which extends behind the respective longitudinal member and the transverse member is generally constructed to be softer in the direction toward the vehicle center so that a rim which is displaced backward in the longitudinal vehicle direction as a result of an accident and which turns inwardly and backwardly toward the vehicle center can result in substantial intrusions. Furthermore, such a rim which turns inwardly toward the vehicle center can no longer fail in a selective manner or cannot be selectively used to absorb impact or accident energy and for support on the shell structure located behind so that the energy absorption capacity in the region of the front car section and the front wheel which is affected accordingly as a result of the accident is reduced, which may in turn generally result in sub-optimal accident behavior of the motor vehicle.

US 2015/0166112 A1 further discloses a reinforcement structure for a vehicle body. US 2014/0292031 A1 discloses a lateral vehicle body structure. US 2006/0273627 A1 discloses a vehicle body arrangement. WO 94/06669 A1 further discloses a reinforcement of a front side door opening. Furthermore, DE 10 2011 089 153 A1 discloses a structure for a motor vehicle.

An object of the present invention is therefore to provide a body having a shell structure and a passenger motor vehicle having such a self-supporting body so that a particularly advantageous accident behavior of the passenger motor vehicle can be achieved by means of the shell structure, particularly in the event of a front-end collision with small width overlap of the motor vehicle with an obstacle or another vehicle.

This object is achieved according to the invention by a body and by a passenger motor vehicle in accordance with the independent claims. The dependent claims relate to advantageous developments of the invention.

A first aspect of the invention relates to a body for a passenger motor vehicle. The term "body" is intended to be understood to mean a self-supporting body which is also referred to as a shell, passenger car body or motor vehicle body. The body has at least one shell structure which is arranged behind a wheel housing for a front wheel of the passenger motor vehicle in the longitudinal vehicle direction. This means that, in the completely produced state of the passenger motor vehicle, the front wheel mentioned is at least partially received or arranged in the wheel housing. The shell structure comprises at least one transverse member which extends, particularly in the transverse vehicle direction, at the outer side of a longitudinal member of a main longitudinal member plane in the transverse vehicle direction in front of a front end wall of the shell structure. The longitudinal member is occasionally also referred to as an engine carrier. The end wall is, for example, an end wall of a passenger compartment, also referred to as an interior, of the passenger motor vehicle or the body, wherein the passenger compartment is delimited by the end wall in the longitudinal vehicle direction in the forward direction at least partially, in particular at least mainly or completely. Consequently, for example, the passenger compartment is separated from a front car section or front car region of the body by the end wall in the longitudinal vehicle direction, wherein the front car section is arranged in front of the end wall in the longitudinal vehicle direction. The end wall is also referred to, for example, as the splashboard.

In order now to be able to achieve a particularly advantageous accident behavior of the passenger motor vehicle in particular in the event of a front-end collision with small width overlap of the passenger motor vehicle (which is also simply referred to as a motor vehicle) with an obstacle or another vehicle, there is provision according to the invention for the transverse member to comprise a catch element which is configured to catch a rim of the front wheel, which turns inward and backward in the direction toward the vehicle center as a result of an accident, that is to say, is displaced backward as a result of the mentioned front-end collision in the longitudinal vehicle direction.

Consequently, it is possible using the catch element, in the event of a front-end collision of the passenger motor vehicle with small width overlap with an obstacle or another vehicle and in the event of an associated, accident-related backward displacement of the front wheel which is affected by the collision, to prevent excessive inward rotation of a rear region of the front wheel or the rim thereof, that is to say, a region which is directed backward in the longitudinal vehicle direction, by the rear region of the rim being caught by means of the catch element of the transverse member. As a result of the catch element, accordingly, an excessive inward rotation of the rear region of the rim of the front wheel is intended to be achieved, in particular after a tire of the front wheel surrounding the rim has been destroyed, so that the rim of the front wheel is displaced at least substantially in the longitudinal vehicle direction or is turned inwardly simply by a specific small angle with the backward region thereof, and so that the rim can be supported on the shell structure which is behind it behind the wheel housing of the front wheel of the motor vehicle in an improved manner in comparison with conventional solutions. The invention is based on the recognition or the experience that the shell structure behind the wheel housing of the front wheel, for example, as a result of the transverse member being supported on a lateral sill therebehind, is substantially stiffer externally than internally, whereby increased intrusions in the region of the passenger compartment can occur, if no corresponding counter-measures are in place. The term "front-end collision with small width overlap" is intended to be understood to be such a front-end collision or such a front-end impact, in which the obstacle or the other vehicle covers less than half of the width, extending in a transverse vehicle direction, of the passenger motor vehicle and strikes the passenger motor vehicle, in particular the front end thereof, in the longitudinal vehicle direction in a backward direction.

Such excessive intrusions in the region of or in the passenger compartment can now be avoided. According to the invention it may be possible using the catch element for the rim, which turns inward as a result of the backward displacement thereof and the retention thereof by the chassis members (links) with the rear region thereof to be caught and consequently reduced or stopped in terms of the inwardly rotating movement thereof so that the rim can be guided at least in an external region of the shell structure on stiffer structures behind it, such as, for example, a door pillar which extends in this region and which is, for example, in the form of an A-pillar, or the lateral sill. This results in a generally particularly advantageous support of the rim and prevention of excessive intrusions into the passenger compartment.

Since the rigidity and consequently the counter-force of the shell structure are externally substantially greater than in the direction toward the vehicle center, a selective failure of the rim becomes possible, which promotes in a desired manner an at least substantially uniform absorption of impact or accident energy in the region of the front car section. Besides the advantage that consequently softer inner structures of the shell structure can be protected behind the wheel housing and consequently intrusions can be substantially reduced, an action, for example, of an underfloor high-voltage store which can be connected to the transverse member at the rear of the transverse member of the shell structure can ultimately also be reduced and consequently an additional source of danger can be minimized.

In order to further achieve particularly advantageous accident behavior, there is further provision according to the invention for the shell structure to have the above-mentioned A-pillar which is arranged behind the catch element in the longitudinal vehicle direction. The A-pillar is a door pillar or the door pillar which is mentioned previously and which at least partially, in particular at least mainly or completely delimits, for example, a lateral door opening of the body in the longitudinal vehicle direction in the forward direction. In the completely produced state of the passenger motor vehicle, a side door which is pivotably retained on the body is associated with the mentioned door opening. In this case, the side door can be pivoted between a closed position and at least one open position relative to the body. In the closed position, the side door closes at least one tolerance region of the door opening, wherein the side door releases the part-region in the open position. The feature that the A-pillar is arranged behind the catch element in the longitudinal vehicle direction, may in particular be understood to mean that the A-pillar is arranged further backward than the catch element in the longitudinal vehicle direction. In this case, it is contemplated for the catch element to be arranged toward the rear without any overlap with respect to the A-pillar in the longitudinal vehicle direction and consequently not to be covered by the A-pillar toward the rear in the longitudinal vehicle direction or the catch element to be covered or overlapped by the A-pillar at least partially, in particular at least mainly or completely, toward the rear in the longitudinal vehicle direction.

There is further provision according to the invention for the shell structure to comprise a lateral sill or the lateral sill which was mentioned previously and which is arranged behind the catch element in the longitudinal vehicle direction. The feature that the lateral sill is arranged behind the catch element in the longitudinal vehicle direction may be understood in particular to mean that the lateral sill is arranged further to the rear in the longitudinal vehicle direction or begins further back than the catch element. It is particularly conceivable for the catch element to be arranged without any overlap with respect to the lateral sill toward the rear in the longitudinal vehicle direction and consequently not to be covered or overlapped by the lateral sill toward the rear in the longitudinal vehicle direction or the catch element to be covered or overlapped by the lateral sill at least partially, in particular at least mainly or completely, toward the rear in the longitudinal vehicle direction. The A-pillar is connected to the lateral sill, for example, in particular in a node region or via a node or by means of a node so that, for example, the lateral sill can be arranged under the A-pillar in the vertical vehicle direction, particularly in such a manner that the A-pillar is covered by the lateral sill at least partially, in particular at least mainly or completely, in a downward direction in the vertical vehicle direction.

The shell structure of the body according to the invention further has a support element which is constructed in particular separately from the lateral sill and separately from the A-pillar and which is arranged in the A-pillar and which can also be referred to or act as an energy absorption element or crash box. The catch element which is displaced backward in the longitudinal vehicle direction as a result of the rim being caught as a result of an accident and the rim which is thereby displaced backward as a result of an accident in the longitudinal vehicle direction can be supported via the support element on the lateral sill backward in the longitudinal vehicle direction. The support element is a stiff structure which provides a high counter-force as a result of the accident-related backward displacement of the catch element and the rim and, for example, acts counter to the catch element and the rim in order thereby to support in a stable manner the rim, which is also referred to as the wheel rim, and, for example, a brake disk which is associated with the front wheel and to cause it to fail, in particular to break, at a particularly early time. The above-mentioned brake disk is, for example, a component of a friction brake of the passenger motor vehicle, by means of the friction brake of which during travel of the passenger motor vehicle the front wheel can be braked by friction. Forces which act on the support element as a result of the accident-related backward displacement of the catch element and the rim from the rim via the catch element and from the catch element to the support element can be introduced in a particularly advantageous manner into the lateral sill, in particular into a reinforcement element of the lateral sill, which reinforcement element is provided in order to reinforce the lateral sill and is also referred to as a lateral sill reinforcement. The rim and the brake disk can thereby be destroyed in a particularly early manner, in particular broken, so that excessive intrusions can be prevented.

In order to be able to bring about a particularly great counter-force in order to support and in particular break the rim, there is provision in one embodiment of the invention for the support element to be of wedge-like form, wherein the support element extends diagonally in a corner region which is formed by the lateral sill and the A-pillar.

In this case, it has been found to be particularly advantageous if the support element is supported in a downward direction in the vertical vehicle direction, particularly directly, on the lateral sill, in particular on the lateral sill reinforcement which is also referred to as the sill reinforcement. Consequently, the support element is preferably covered in the vertical vehicle direction in a downward direction at least partially, in particular at least mainly or completely, by the lateral sill, in particular the lateral sill reinforcement. Alternatively or additionally, the support element can be supported in the forward direction in the longitudinal vehicle direction, particularly directly, on the A-pillar. Consequently, the support element is preferably covered in the longitudinal vehicle direction in a forward direction at least partially, in particular at least mainly or completely, by the A-pillar. Accident-related forces which act from the rim on the catch element and consequently the transverse member and from the transverse member on the A-pillar, can thereby be transmitted particularly advantageously and in particular at least substantially directly from the A-pillar via the support element on the lateral sill and consequently be supported on the lateral sill so that the rim can be supported particularly advantageously and can preferably also be destroyed or broken particularly early.

Another embodiment is characterized in that an upper side, which is directed upward in the vertical vehicle direction, of the support element extends in the longitudinal vehicle direction from the upper front region toward the lower rear region. For example, a particularly closed or open hollow cross section of the support element is at least partially, in particular at least mainly or completely, delimited by the upper side upward in a vertical vehicle direction. This upper side extends, preferably over the entire extent thereof, obliquely relative to the longitudinal vehicle direction and obliquely relative to the vertical vehicle direction and from the upper front region to the lower rear region. Again in other words, the upper side falls away when viewed from the front toward the rear in the longitudinal vehicle direction and consequently extends backward in the longitudinal vehicle direction successively or constantly in the direction of the lateral sill. A particularly advantageous support can thereby be achieved.

Preferably, the support element is characterized in that it is or forms or constitutes a self-contained structure, whereby the support element has a particularly great rigidity per se. In other words, it has been found to be particularly advantageous for the support element per se, that is to say, when viewed in isolation, to be a closed profile. It is thereby possible to achieve a particularly high rigidity of the support element per se so that the catch element and consequently the rim can be supported in a particularly advantageous manner.

Another advantage of the above-described wedge-like shape of the support element is particularly that the support element can be integrated in the A-pillar in a particularly simple manner as a result of the wedge-like form thereof and can be joined to the lateral sill and/or to the A-pillar by already available joining methods and consequently in a particularly simple manner. For example, the support element can thereby be integrated in a production of the body in a particularly simple manner.

Another embodiment is characterized in that the support element has per se, that is to say, when viewed in isolation, an open profile at precisely one side, that is to say, at a single side, and thereby has per se, that is to say, when viewed in isolation, a hollow cross section which is open at the side, that is to say, only at the side, and which is supplemented by the lateral sill or the A-pillar to form a closed hollow cross section. If the open hollow cross section is supplemented by the lateral sill to form the closed hollow cross section, the side at which the profile is open is directed downward in the vertical vehicle direction. If the open hollow cross section is supplemented by the A-pillar to form the closed hollow cross section, the side at which the profile is open is directed forward in the longitudinal vehicle direction. A particularly great rigidity and consequently a particularly high level of support can thereby be achieved.

In order to achieve a particularly high level of rigidity of the support element, in another embodiment of the invention there is provision for the support element to be constructed in several pieces. This means that the support element has a plurality of components which are preferably each constructed in one piece and which are constructed separately from each other and connected to each other. In particular, the components are connected to each other in a materially engaging manner and adhesively bonded to each other and/or welded to each other.

In this case, it has been found to be advantageous for achieving a particularly great rigidity and consequently a particularly advantageous support for the support element to be constructed in precisely two pieces and thereby to have precisely two components which are each constructed in one piece and which are constructed separately from each other and which are connected to each other.

It can generally be seen that the support element is preferably in the form of a crash box which may be in several pieces, in particular two pieces, but which is still self-contained and which can be particularly distinguished in that it can be configured to be very rigid and readily integrated into an available structure, in particular in the form of the A-pillar. For example, the support element is connected to the A-pillar and/or the lateral sill by spot welding, that is to say, by means of weld spots. As a result of the multi-piece or two-piece configuration of the support element, a particularly favorable weld spot loading can be prevented by avoiding cross tension. Ultimately, therefore, very high counter-forces are possible in comparison with conventional solutions in order to cause the rim to fail or to break, in particular before the rim can strike softer, further inwardly located regions.

The support element being in multiple or two pieces is also advantageous in that a scalability of the support element, with particular regard to the rigidity thereof, can thereby be achieved. Particularly as a result of a corresponding selection of a material, from which the respective component of the support element is formed, the rigidity of the support element can be adjusted according to requirements and selectively. In this instance, it is conceivable for the components of the support element to be made from the same material or from mutually different materials so that, for example, one of the components is made from a first material and a second one of the components is made from a second material which is different from the first material.

It has been found to be further particularly advantageous for the support element to be made from a metal material, in particular from steel. It is thereby possible to achieve a particularly great rigidity of the support element and consequently a particularly advantageous support.

A second aspect of the invention relates to a passenger motor vehicle which has a self-supporting body according to the first aspect of the invention. Advantages and advantageous embodiments of the first aspect of the invention are intended to be considered to be advantages and advantageous embodiments of the second aspect of the invention, and vice versa.

The catch element itself may, for example, be constructed by suitable forming of the transverse member itself or by an additional member which is arranged, for example, as a type of projection or the like at the outer side or at the front of the transverse member. By means of the catch element, during the accident-related backward displacement of the front wheel, and in particular after the destruction of the tire which surrounds the rim, in particular an external rim flange of the rim can be caught in order consequently to prevent excessive penetration of the rim into the rear region. Consequently, this inward rotation by catching preferably the external rim flange of the rim in the rear region by means of the catch element is stopped or at least kept small in order consequently to achieve an orientation of the rim at least substantially in the longitudinal vehicle direction or with a merely small angular value obliquely thereto so that the rim can be supported in a particularly exemplary manner in an external region of the shell structure or the transverse member and so as to overlap with the A-pillar which is behind and which is in the form of a door pillar or the lateral sill which is behind.

In this context, it has been found to be advantageous for the catch element to be in the form of a catch edge of the transverse member, which catch edge extends in the vertical vehicle direction. Such a catch edge can be introduced, for example, simply by being formed in a corresponding profile of the transverse member.

In another embodiment of the invention, it has been found to be advantageous for the catch edge to be constructed in a front, external shell element of the transverse member. This allows a particularly effective and similarly simple configuration of the shell structure.

In another embodiment of the invention, it has been found to be advantageous for the catch edge to be constructed by an angle between two surface zones of the external shell element of the transverse member. In the region of the angle or the angled portion, the catch edge preferably extends substantially in the vertical vehicle direction or perpendicularly.

It has further been found to be advantageous for the catch element or the catch edge to extend at least over the entire height, which extends in the vertical vehicle direction, of the transverse member. This thereby leads to a particularly effective way of catching the rear region of the front wheel or the rim and very particularly the rim flange thereof.

Another embodiment of the invention makes provision for the external shell element to be jointly welded to an internal shell element of the transverse member and a structural element of the laterally corresponding lateral sill. Consequently, this results in a particularly stiff and stable configuration of the transverse member which is configured to prevent it from being torn out when striking the backwardly displaced rim if the two shell elements and the structural element of the lateral sill are connected to each other in three layers one above the other and, for example, by flanges which connect all three components to each other in a sandwich-like manner.

Another advantageous embodiment of the invention makes provision for the shell structure to have a reinforcement element in the region of the catch element. Another improved support of the rim is thereby achieved.

Finally, it has been found to be advantageous for the reinforcement element to be arranged inside a hollow space of the transverse member. Consequently, the transverse member is stiffened in an optimum manner and constructed to support the rim in order furthermore to prevent possible intrusions into the front end wall.

Additional features of the invention will be appreciated from the claims, the Figures and the description of the Figures. The features and feature combinations which are mentioned above in the description and the features and feature combinations which are mentioned below in the description of the Figures and/or which are shown only in the Figures can be used not only in the combination set out, but also in other combinations or alone.

The invention will now be explained in greater detail with reference to a preferred embodiment and the drawings.

BRIEF DESCRIPTION OF THE DRAWINGS

In the Figures, identical or functionally identical elements are denoted with the same reference numerals.

DETAILED DESCRIPTION OF THE DRAWINGS

Figure 1:
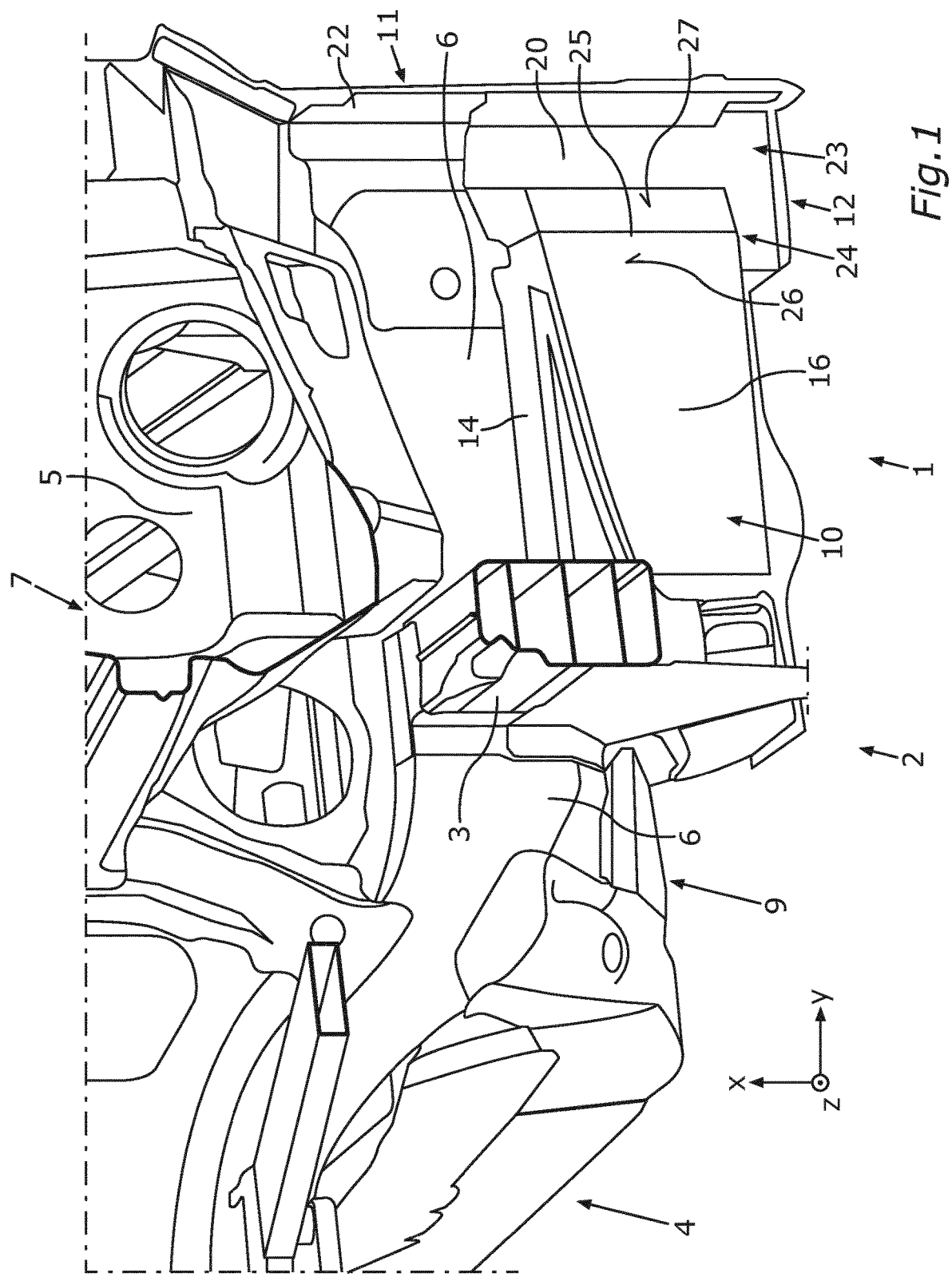
FIG. 1 is a cutout of a schematic and perspective front view of a shell structure of a body according to the invention of a passenger motor vehicle.

FIG. 1 shows a cutout of a perspective view of a self-supporting body, which is also referred to as a motor car body or passenger motor vehicle body, of a passenger motor vehicle. The self-supporting body has a shell structure 1 which is arranged in the longitudinal vehicle direction behind a wheel housing (not visible in FIG. 1) of a front wheel of the passenger motor vehicle. Of a front car section 2, which is also referred to as the front car region, of the body or the passenger motor vehicle, in the present case in particular a longitudinal member 3 (which is illustrated in a cut-away manner) of a main longitudinal member plane can be seen, wherein the longitudinal member 3 is also occasionally referred to as an engine carrier. Such a longitudinal member 3 of the shell structure 1 is located in a mirror-symmetrical manner at the outer side of a central tunnel-like member 4 at the other vehicle side. In this instance, the respective longitudinal member 3 is supported in a backward direction on a transverse member element, which is also referred to as a transverse member, of the shell structure 1. The transverse member element 6 extends in the transverse vehicle direction over the entire vehicle width which extends in the transverse vehicle direction and which is also referred to simply as the width, wherein the transverse vehicle direction is also referred to as the y direction. The transverse member element 6 bridges the central tunnel-like member 4 in a curved manner. Furthermore, an end wall 5 of the shell structure can be seen above the transverse member element 6. The end wall 5 subdivides the front car section 2 from a passenger compartment 7, which is located behind it in the longitudinal vehicle direction (x direction), of the body or the passenger motor vehicle which is also simply referred to as a motor vehicle. The end wall 5 extends primarily from an upper transverse windscreen carrier downward and merges at that location into a vehicle floor 9 which comprises or forms, for example, the mentioned central tunnel-like member 4.

The shell structure 1 which is arranged in the longitudinal vehicle direction behind the wheel housing of the front wheel substantially comprises a transverse member 10 or similar transverse element which externally adjoins the laterally corresponding longitudinal member 3 or is connected thereto and which extends in the transverse vehicle direction toward the vehicle exterior as far as the region of a lateral wall 11. With respect to the transverse vehicle direction (y direction), the transverse member 10 consequently overlaps with the external end thereof a front region of a lateral sill 12 of the shell structure 1 or a pillar base, which extends in this region, of a door pillar which is in the form of an A-pillar 13. Furthermore, FIG. 1 clearly shows that the transverse member 10 extends in front of the front end wall 5 in the transverse vehicle direction or is connected thereto and/or to the transverse member element 6 associated therewith via a flange connection 14.

Figure 2:
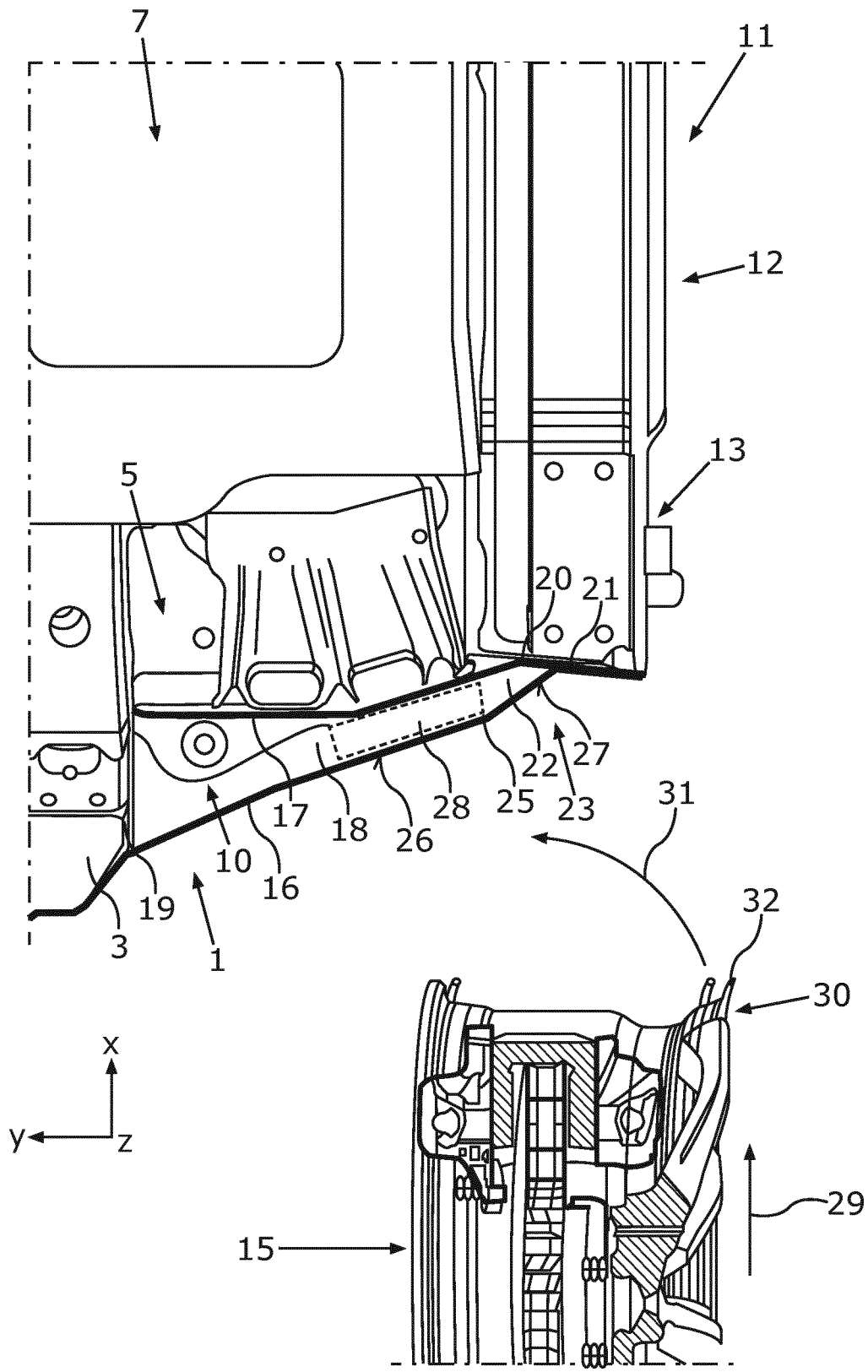
FIG. 2 is a cutout of a schematic plan view of the shell structure.

FIG. 2 shows in a cutout and partially sectioned plan view the shell structure 1 according to FIG. 1 and a rim 15 of the front wheel which is on the left when viewed in the forward travel direction and which is arranged in front of the corresponding shell structure 1 or the transverse member 10 in the longitudinal vehicle direction (x direction). The front wheel or the rim 15 thereof is illustrated in an initial position for travel in a straight line in this case. In this instance, the front wheel is usually articulated to an associated front axle and retained via chassis members which cannot be seen in greater detail and which are also referred to as links.

Of the transverse member 10 which is arranged in the longitudinal vehicle direction (x direction) behind the front wheel or the rim 15, a front external shell element 16 and a rear shell element 17 which are connected to each other with a hollow space 18 being formed or are secured at the front side of the end wall 5 can be seen. In this case, FIG. 2 again clearly shows that the transverse member 10 or the respective shell elements 16, 17 extend substantially between an external side 19 of the laterally associated longitudinal member 3 and the lateral sill 12 or the A-pillar 13 which is arranged in the front region thereof. In this case, it can particularly be seen that the front shell element and the rear shell element 16, 17 have respective flanges 20, 21 which form with a front, end structural element or sheet metal element 22 of the laterally corresponding lateral sill 12 or the associated door pillar (A-pillar 13), a three-layered planar interconnected arrangement or a corresponding flange connection 23 which are connected to each other by continuous spot welding. Since the two shell elements 16, 17 and the structural element 22 are consequently connected via respective 3 sheet metal locations, respective through-holes can be dispensed with, particularly in the front or external shell element 16.

Furthermore, particularly when FIGS. 1 and 2 are viewed together, it can be seen that the transverse member 10 has a catch element 24 in the form of a catch edge 25 which is constructed in the front shell element 16 and the function of which will be explained in even greater detail below. In the present embodiment, the shell elements 16, 17 are configured from respective sheet metal shaped components so that the catch edge 25 can be introduced, for example, simply by corresponding forming. The catch edge 25 extends—as can be seen particularly clearly in FIG. 1—in a manner located over the at least substantially complete height of the transverse member 10 or the front shell element 16. In this case, the catch edge 25 is constructed by an angle between two substantially planar surface zones 26 and 27 of the external front shell element 16.

FIG. 2 further shows that a reinforcement element 28 whose function will also be explained in even greater detail below is arranged inside the hollow space 18 of the transverse member 10. In this case, the reinforcement element 28 can be fixed, for example, by a joining connection or the like inside the hollow space 18 of the transverse member 10. In the present embodiment, the reinforcement element 28 extends from the catch edge 25 at least substantially in the transverse vehicle direction (y direction) toward the vehicle center. Since the catch edge 25 substantially extends in continuation of an inner side of the lateral sill 12, the reinforcement element 28 consequently extends in this case substantially from the inner side of the lateral sill 12 toward the vehicle center.

If, as a result of a front-end collision with small width overlap of the passenger motor vehicle with another vehicle or a barrier, an accident-related backward displacement of the front wheel and in particular the rim 15 in the longitudinal vehicle direction (x direction) backward is brought about, which is indicated by an arrow 29, this results in an inward rotation of a rear region 30 of the rim 15 in the transverse vehicle direction (y direction) toward the vehicle center as a result of the articulation or connection of the front wheel or the rim 15 to the corresponding chassis members or links, which is indicated by an arrow 31.

In order now to prevent excessive inward rotation of the front wheel or the rim 15 about a notional axis which extends at least substantially in the vertical vehicle direction, the front wheel which is displaced backward as a result of the accident or the associated rim 15 is caught by means of the catch edge 25. In specific terms, this means that in particular an external rim flange 32 of the rim 15 is caught by the catch edge 25 when the rim 15 as a result of an accident is displaced backward in the longitudinal vehicle direction (x direction) (arrow 29) and accordingly rotates inwardly with the rear region 30 thereof about the notional axis toward the vehicle center (arrow 31).

In other words, consequently, the catch edge 25 enables the rim 15 not to rotate excessively inward but instead to remain substantially in the extent direction thereof which extends in the longitudinal vehicle direction. Consequently, the rim 15 should at most be supported on the transverse member 10 with a moderate steering lock angle of the rear region 30 thereof toward the vehicle center. This initially means that no softer regions of the shell structure 1 near the outer side 19 of the longitudinal member 3 are affected, which could lead to excessive intrusions in the region of the passenger compartment and improved support of the rim 15 so that it can be caused to break as a result of the accident-related action of forces, which again reduces the stress on the surrounding shell structure 1. A better energy absorption capacity in the region of the front car section 2 and generally an improved accident behavior are thereby generally produced.

Instead of the catch edge 25—as already explained—for example, another catch element, such as a strip which is arranged at the outer side of the transverse member 10 or the shell element 16, or the like, is contemplated. However, a catch edge 25, as described in this instance, has a particularly simple and highly effective configuration.

Figure 3:
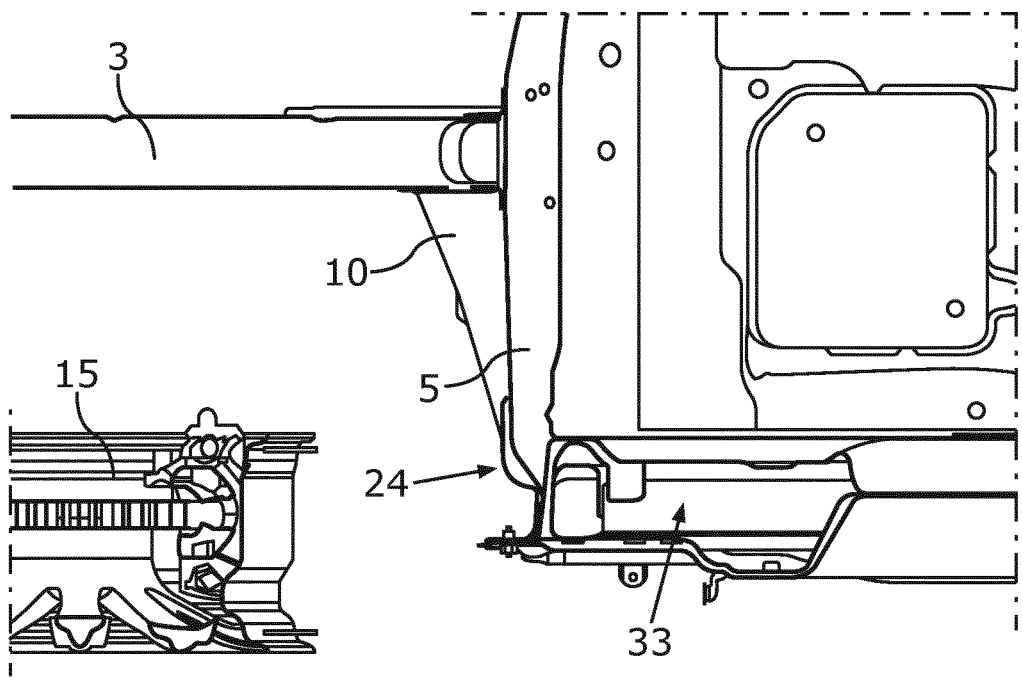
FIG. 3 is a cutout of an additional schematic plan view of the shell structure.
Figure 4:
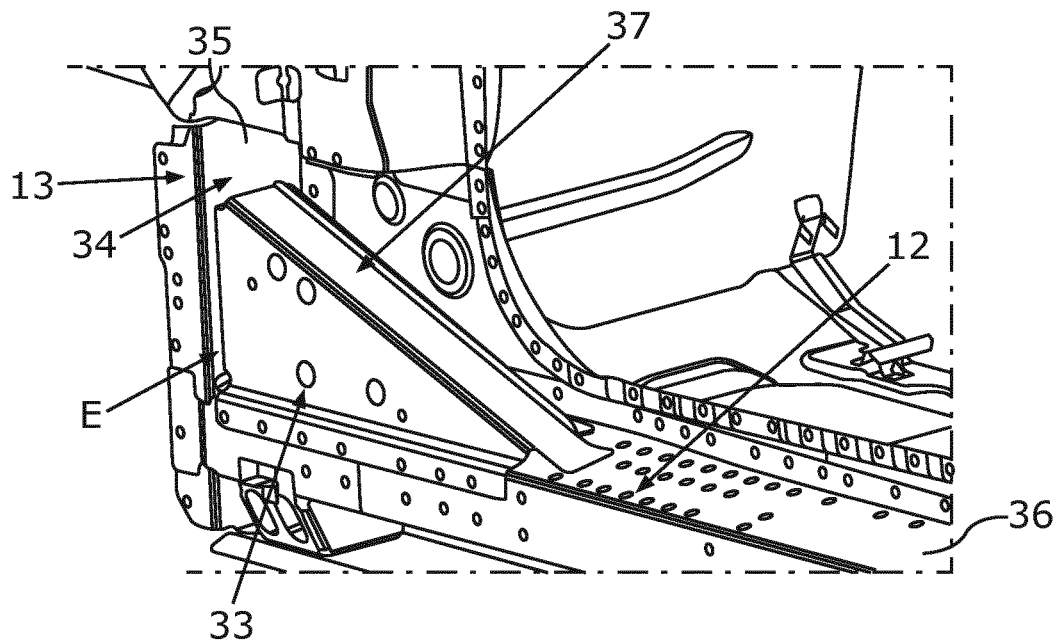
FIG. 4 is a cutout of a schematic perspective view of the shell structure.
Figure 5:
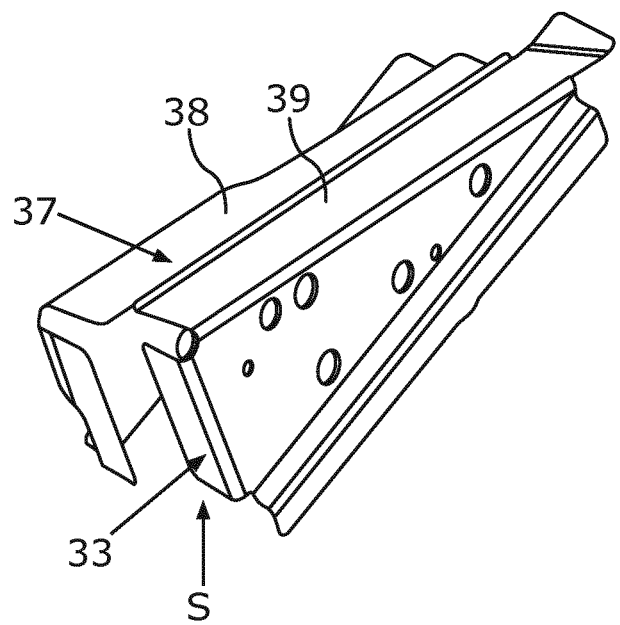
FIG. 5 is a schematic and perspective exploded view of a support element of the shell structure.

In order now to be able to achieve a particularly advantageous accident behavior of the passenger motor vehicle, the shell structure 1 which comprises the A-pillar 13 and the lateral sill 12, wherein the A-pillar 13 and the lateral sill 12 are arranged in the longitudinal vehicle direction behind the catch element 24, in particular behind the catch edge 25, also comprises a support element 33 which is arranged in the A-pillar and which can be seen in particular in FIGS. 3 to 5. The catch element 24 which is displaced backward as a result of the rim 15 being caught as a result of an accident in the longitudinal vehicle direction (x direction) can be supported via the support element 33, and thereby the rim 15 which is displaced backward as a result of an accident in the longitudinal vehicle direction (x direction) can be supported toward the rear in the longitudinal vehicle direction on the lateral sill 12. In this case, FIG. 4 particularly clearly shows that the support element 33 is constructed separately from the lateral sill 12 and separately from the A-pillar 13. In particular, the support element 33 is arranged in a hollow space 34 of the A-pillar 13, the hollow space 34 of which is delimited toward the front in the longitudinal vehicle direction at least partially, in particular at least mainly or completely, by a front pillar portion 35 of the A-pillar 13. In particular, the support element 33 is arranged in the above-mentioned pillar base of the A-pillar 13, via which the A-pillar 13 is connected to the lateral sill 12. The hollow space 34 is, for example, a hollow cross section of the A-pillar 13, wherein the hollow space 34 can be delimited toward the bottom in the longitudinal vehicle direction at least partially, in particular at least mainly or completely, by the lateral sill 12. Of the lateral sill 12, FIG. 4 shows a reinforcement element 36 which is also referred to as a sill reinforcement or lateral sill reinforcement and by which the lateral sill 12 is reinforced or configured.

Furthermore, FIG. 4 shows particularly clearly that the support element is constructed at least substantially in a wedge-like manner, wherein the support element 33 extends diagonally in a corner region E which is formed by the lateral sill 12, in particular the reinforcement element 36, and the A-pillar 13, in particular the pillar portion 35. In this case, for example, the support element 33 is supported in the vertical vehicle direction downward, in particular directly, on the lateral sill 12, in particular on the reinforcement element 36, and/or in the longitudinal vehicle direction forward, in particular directly, on the A-pillar 13, in particular on the pillar portion 35. Furthermore, the support element 33 is constructed in such a wedge-like manner that an upper side 37, which is directed upwardly in the vertical vehicle direction, of the support element 33 extends in the longitudinal vehicle direction from the upper front region toward the lower rear region and consequently extends in the longitudinal vehicle direction backward obliquely relative to the longitudinal vehicle direction and/or to the vertical vehicle direction successively toward the lateral sill 12.

In principle, it is contemplated for the support element 33 to be a closed profile per se. In the embodiment which is shown in the Figures, however, there is provision for—as can be seen particularly clearly in FIGS. 5 and 6—the support element 33 to be a profile which is open at precisely one side S per se and thereby per se to have a hollow cross section Q which is open at the side S, wherein the S is directed downward in the vertical vehicle direction and consequently faces the lateral sill 12. The open hollow cross section Q is supplemented by the lateral sill 12, in particular by the reinforcement element 36, to form a closed hollow cross section. It is thereby possible to achieve a particularly great rigidity.

Figure 6:
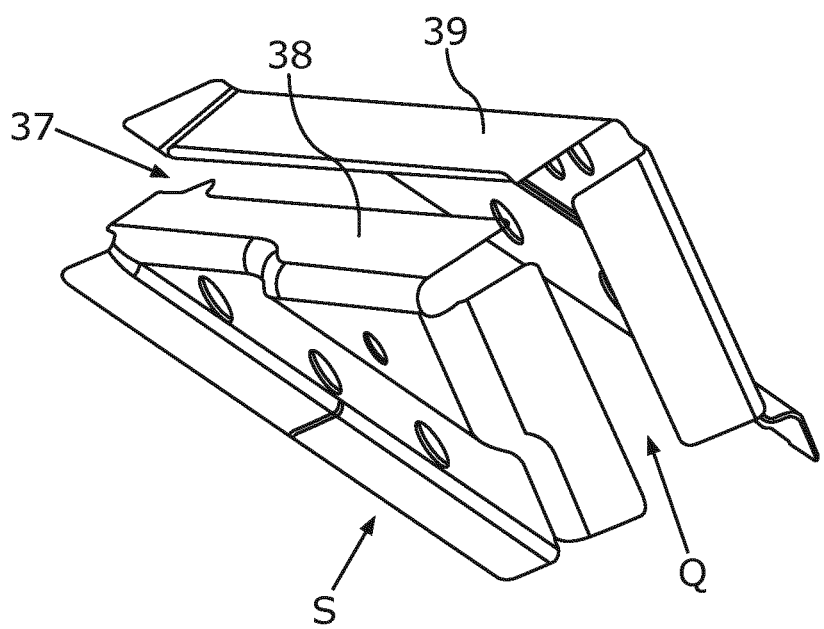
FIG. 6 is another schematic and perspective exploded view of the support element.

Finally, FIGS. 5 and 6 particularly clearly show that the support element 33 is constructed in two pieces and thereby has precisely two components 38 and 39 which are constructed in one piece. Preferably, the components 38 and 39 are made from a metal material. The components 38 and 39 are constructed separately from each other and connected to each other, in particular connected to each other in a materially engaging manner, and, for example, adhesively bonded to each other and/or welded to each other. The components 38, 39 per se are shell elements which in the assembled state form the mentioned profile of the support element 33. The components 38, 39 are connected to each other via respective joining flanges which, for example, at least partially overlap each other. Furthermore, for example, the support element 33 is connected to the lateral sill 12 and/or the A-pillar 13 via respective joining flanges.

By using the support element 33, it is possible to place a particularly great counter-force against the rim 15 or the accident-related backward displacement in order thereby to support the rim 15 in particular via the catch element 24 particularly well and to cause it to break particularly early. Furthermore, the intrusions can thereby be prevented.

LIST OF REFERENCE NUMERALS

1 Shell structure
2 Front car section
3 Longitudinal member
4 Central tunnel-like member
5 End wall
6 Transverse member element
7 Passenger compartment
9 Vehicle floor
10 Transverse member
11 Lateral wall
12 Lateral sill
13 A-pillar
14 Flange connection
15 Rim
16 Shell element
17 Shell element
18 Hollow space
19 Outer side
20 Flange
21 Flange
22 Sheet metal element
23 Flange connection
24 Catch element
25 Catch edge
26 Surface zone
27 Surface zone
28 Reinforcement element
29 Arrow
30 Rear region
31 Arrow
32 Arrow
33 Support element
34 Hollow space 35 Pillar portion
36 Reinforcement element
37 Upper side
38 Component
39 Component
Q Cross section
S Side

The invention claimed is:

1. A body for a passenger motor vehicle, comprising:
a shell structure which is arranged behind a wheel housing for a front wheel of the passenger motor vehicle, the shell structure comprising:
   a transverse member that extends on an outer side of a longitudinal member of the shell structure in front of a front end wall of the shell structure in a transverse vehicle direction, wherein:
   the transverse member has a catch element configured to catch a rim of the front wheel which is displaced backward in a longitudinal vehicle direction as a result of an accident, which rim turns inward in a backward direction toward a vehicle center;
   an A-pillar is arranged behind the catch element in the longitudinal vehicle direction;
   a lateral sill is arranged behind the catch element in the longitudinal vehicle direction;
   a support element is arranged in the A-pillar via which the catch element, which is displaced backward in the longitudinal vehicle direction as a result of the rim being caught as a result of an accident, is supportable, and thereby the rim which is displaced backward in the longitudinal vehicle direction as a result of the accident is supportable on the lateral sill in a backward direction in the longitudinal vehicle direction; and
   the transverse member comprises a front shell element and a rear shell element which are connected to one another to form a hollow space, wherein a reinforcing element is arranged in the hollow space and extends from the catch element in the transverse vehicle direction toward the vehicle center.

2. The body according to claim 1, wherein
the support element is of wedge-shaped form and extends diagonally in a corner region which is formed by the lateral sill and the A-pillar.

3. The body according to claim 2, wherein
the support element is supported in a downward direction in a vertical vehicle direction, directly on the lateral sill, and/or in a forward direction in the longitudinal vehicle direction directly on the A-pillar.

4. The body according to claim 2, wherein
an upper side, which is directed upward in the vertical vehicle direction, of the support element extends from an upper front region to a lower rear region in the longitudinal vehicle direction.

5. The body according to claim 1, wherein
the support element has a closed profile.

6. The body according to one of claim 1, wherein
the support element has a profile which is open at precisely one side and thereby a hollow cross section which is open at the side and which is supplemented by the lateral sill or the A-pillar to form a closed hollow cross-section.

7. The body according to claim 1, wherein
the support element is constructed in several pieces.

8. The body according to claim 7, wherein
the support element is constructed in two pieces and has only two integrally constructed components which are constructed separately from each other and which are connected to each other.

9. The body according to claim 1, wherein
the support element is a metal support element.

10. The body according to claim 9, wherein
the support element is a steel support element.

11. A passenger motor vehicle comprising a body according to claim 1.

* * * * *